L. HAY.
VEHICLE TIRE.
APPLICATION FILED DEC. 11, 1914.

1,160,508.

Patented Nov. 16, 1915.

WITNESSES

INVENTOR
Lewis Hay.
By J. W. Cooke
Attorney.

UNITED STATES PATENT OFFICE.

LEWIS HAY, OF PITTSBURGH, PENNSYLVANIA.

VEHICLE-TIRE.

1,160,508.

Specification of Letters Patent.

Patented Nov. 16, 1915.

Application filed December 11, 1914. Serial No. 876,657.

*To all whom it may concern:*

Be it known that I, LEWIS HAY, a citizen of the United States, and a resident of Pittsburgh, in the county of Allegheny and State of Pennsylvania, have invented a new and useful Improvement in Vehicle-Tires; and I do hereby declare the following to be a full, clear, and exact description thereof.

My present invention relates to new and useful improvements in vehicle tires, and has particular reference to that type of tire adapted especially for use in connection with automobiles.

The principal object of my invention is to provide an improved form of tire in which the customary inner tube now in use is dispensed with, and the only air cushion employed is the confined volume of air which is inclosed within the shoe or tread of the tire.

An additional object is to substitute for the air cushion ordinarily employed in automobile tires a resilient element which consists in a plurality of substantially U-shaped springs which are arranged in pairs around the rim of the wheel and are circumferentially spaced from each other.

A still further object is to provide an encircling band or rim of metal which is riveted or otherwise secured to the spring members at their outer terminals for holding them in the desired spaced relation to each other and for preventing distortion or displacement of the springs as a result of the tangental thrust to which they are subjected in the use of the tire.

The above and other incidental objects of a similar nature which will be hereinafter more specifically treated are accomplished by such means as are illustrated in the accompanying drawings, described in the specification and then more particularly pointed out in the claims, which are appended hereto and form a part of this application.

Figure 1:
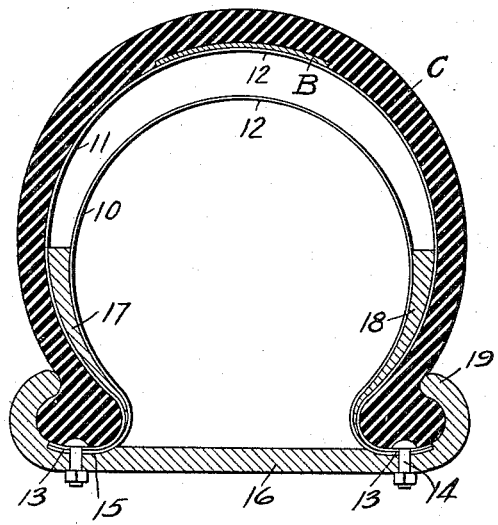
Figure 2:
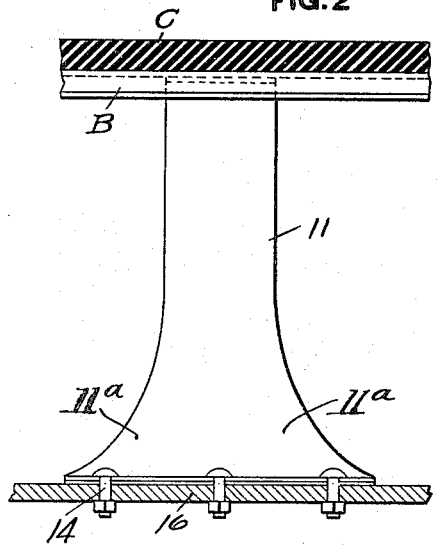
Figure 3:
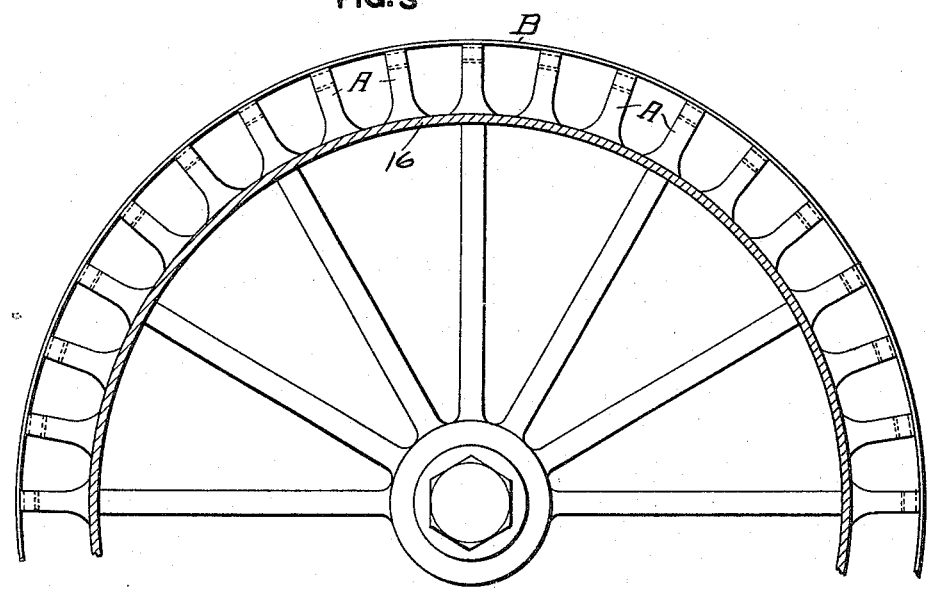

With reference to the drawings wherein there has been illustrated the preferred embodiment of my invention as it is reduced to practice, and throughout the several views of which similar reference numerals designate corresponding parts, Figure 1 is a section taken transversely through the tire and wheel rim. Fig. 2 is a fragmentary section taken longitudinally through the tire. Fig. 3 is a side elevation of a wheel segment, the rim being shown in section and the springs in elevation.

In the embodiment of my invention shown in the accompanying drawings, the tire includes as its essential element of construction a plurality of transversely disposed spring sections A, a reinforcing and connecting rim B, and a shoe C which incloses the members A and B. The spring sections A are all similar in construction and it is deemed necessary therefore to describe only one of them in detail. Reference will therefore now be had particularly to Figs. 1 and 2. Upon reference to these figures it will be seen that each spring section consists of two substantially U-shaped springs 10 and 11, which are formed of relatively light spring steel and are nested one within the other. The bight portions 12 of the members 10 and 11 are separated more widely than are the arm portions. The arm portions are gradually brought together at their inner terminals as shown in Fig. 1, and the extreme terminal portions are enlarged laterally, as indicated at 11$^a$ (Fig. 2). The ends of the arm portions are flatly engaged against each other and bent outwardly at right angles forming the attaching ears 13. These attaching ears 13 of the springs are secured by bolts, rivets or any other equivalent fastening devices 14 within recesses 15 which are formed in the rim 16 of the wheel adjacent the outer edges thereof.

In order to prevent undue flexing of the side or arm portions of the springs 10 and 11 in each set, I have provided for each section or set of springs a pair of spacer blocks 17 and 18. These members 17 and 18 are substantially wedge shaped and may be formed of wood, rubberoid, steel or any other composition which is found desirable for the purpose. In use it has been found preferable to make the spacer blocks of such lengths that their outer terminals extend to the middle of the tire. In practice it has been found expedient to form the members 17 and 18 of steel strips which are welded to the side or arms of the springs and thus securely held in the proper position. In this manner the adjacent arm portions of the springs and the interposed spacer block are bound together as a unit which is strong enough to withstand all strains and stresses to which it is subjected.

It will now be noted particularly upon reference to Fig. 3 of the drawings that the reinforcing or connecting rim B is annular in shape, and is transversely curved, being in fact channel shaped. This rim B engages the outer faces of the outermost springs 11 of the several sets of springs and is preferably secured thereto by rivets or welding, although any equivalent fastening devices may be substituted. It will be observed upon reference to the drawings that the member B serves not only to provide a substantial supporting surface for the tread portion of the shoe or casing C, but that it also serves to connect the spring sections in such manner that they may not be distorted as a result of the tangential thrust put upon them while the wheels of the vehicle are revolving.

The shoe or casing C may be formed of either pure or composition rubber, leather, a durable fabric or any other material which is deemed to be capable of withstanding the conditions under which the tire is to be employed.

Any suitable type of locking ring may be interposed between the edge flanges 19 of the rim and the edge portions of the casing C. In this connection it is desirable to explain that the tire may be employed with any form of automobile wheel rim now in use, for the recesses 15 can of course be formed at the edges of any wheel rim of standard construction.

I now desire to direct particular attention to the fact that my tire is simple in construction and may therefore be made at a relatively low manufacturing cost, and that it is so designed and assembled that it will be capable of withstanding for a considerable length of time all the stress and strains to which it is subjected while in use and that it will not be open to the liability of puncturing as in the case of present day pneumatic tires.

In reduction to practice, I have found that the form of my invention, illustrated in the drawings and referred to in the above description, as the preferred embodiment, is the most efficient and practical; yet, realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

What is claimed is:

1. A vehicle tire including a casing, a plurality of substantially U-shaped spring members arranged within the casing, said spring members being arranged in pairs, the individual springs of each pair being nested, means connecting the adjacent terminals of the individual springs of each pair, and supporting blocks disposed between the arm portions of the individual springs of each pair and secured thereto.

2. In combination, a wheel rim, a plurality of transversely arranged spring units disposed in spaced relation around said rim, each of said units comprising a pair of arcuate resilient members disposed one inside the other and spaced apart at the center, said members having their ends out-turned and enlarged laterally, supporting blocks disposed between said resilient members, one at each side of each unit, and means extending around said rim for connecting said units circumferentially.

In testimony whereof, I the said LEWIS HAY have hereunto set my hand.

LEWIS HAY.

Witnesses:
C. L. LANDON,
T. B. HUMPHRIES.

Copies of this patent may be obtained for five cents each, by addressing the "Commissioner of Patents, Washington, D. C."